(12) United States Patent
Rosales et al.

(10) Patent No.: US 11,490,249 B2
(45) Date of Patent: Nov. 1, 2022

(54) SECURING VEHICLE PRIVACY IN A DRIVING INFRASTRUCTURE

(71) Applicant: Intel Corporation, Santa Clara, CA (US)

(72) Inventors: Rafael Rosales, Unterhaching (DE); Liuyang Lily Yang, Portland, OR (US); Xiruo Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 16/586,540

(22) Filed: Sep. 27, 2019

(65) Prior Publication Data

US 2020/0029210 A1   Jan. 23, 2020

(51) Int. Cl.
| | |
|---|---|
| *H04W 12/02* | (2009.01) |
| *H04L 9/32* | (2006.01) |
| *H04L 9/40* | (2022.01) |
| *H04W 12/08* | (2021.01) |
| *H04W 4/44* | (2018.01) |
| *H04W 76/11* | (2018.01) |
| *H04W 12/069* | (2021.01) |

(52) U.S. Cl.
CPC .......... *H04W 12/02* (2013.01); *H04L 9/3263* (2013.01); *H04L 63/065* (2013.01); *H04W 4/44* (2018.02); *H04W 12/069* (2021.01); *H04W 12/08* (2013.01); *H04W 76/11* (2018.02); *H04L 2209/80* (2013.01); *H04L 2209/84* (2013.01)

(58) Field of Classification Search
CPC ... H04W 12/02; H04W 12/069; H04W 12/08; H04W 4/44; H04W 76/11; H04L 9/3263; H04L 63/065; H04L 2209/84; H04L 2209/80; H04L 63/04; H04L 9/3255; H04L 9/3268; H04L 2209/42

See application file for complete search history.

(56) References Cited

U.S. PATENT DOCUMENTS 10,319,039 B1 * 6/2019 Konrardy ............... G06Q 40/08
2008/0232583 A1 * 9/2008 Di Crescenzo ........... H04L 9/08
                                                           380/44

(Continued)

OTHER PUBLICATIONS

"3GPP TS 33.401 V12.15.0 (Sep. 2015)", 3rd Generation Partnership Project; Technical Specification Group Services and System Aspects; 3GPP System Architecture Evolution (SAE); Security architecture (Release 12), (2015), 131 pgs.

(Continued)

*Primary Examiner* — Taghi T Arani
*Assistant Examiner* — Blake I Narramore
(74) *Attorney, Agent, or Firm* — Schwegman Lundberg & Woessner, P.A.

(57) ABSTRACT

Systems and techniques for securing vehicle privacy in a driving infrastructure are described herein. A vehicle may contact a group identification (ID) issuer to register itself. A group ID may be received from the group ID issuer to indicate acceptance as a member. The vehicle may then contact the driving infrastructure to attach to the driving infrastructure using the group ID to identify the vehicle. In response, the vehicle receives an attachment ID from the driving infrastructure. Here, the attachment ID is used to secure communications between the vehicle and the driving infrastructure.

24 Claims, 15 Drawing Sheets

(56) References Cited

U.S. PATENT DOCUMENTS

| | | | | |
|---|---|---|---|---|
| 2009/0259841 | A1* | 10/2009 | Laberteaux | H04L 63/0823 713/156 |
| 2011/0058673 | A1* | 3/2011 | Zheng | H04L 9/0833 380/255 |
| 2014/0309839 | A1* | 10/2014 | Ricci | G07C 5/0833 701/25 |
| 2016/0050563 | A1* | 2/2016 | Bronk | G06F 21/33 726/7 |
| 2016/0132296 | A1* | 5/2016 | Park | H04L 9/0866 708/255 |
| 2017/0015263 | A1* | 1/2017 | Makled | G06V 20/597 |
| 2018/0242127 | A1* | 8/2018 | Kwoczek | H04W 4/46 |
| 2018/0259976 | A1* | 9/2018 | Williams | G01C 21/3492 |
| 2019/0028448 | A1* | 1/2019 | Farrell | H04L 9/0822 |
| 2019/0039545 | A1* | 2/2019 | Kumar | G07C 5/008 |
| 2019/0322291 | A1* | 10/2019 | Tsuda | G05D 1/0088 |
| 2020/0198620 | A1* | 6/2020 | Nakata | H04W 4/024 |
| 2020/0244671 | A1* | 7/2020 | Nagata | H04L 9/0822 |
| 2020/0294399 | A1* | 9/2020 | Schuller | G08G 1/065 |

OTHER PUBLICATIONS

"3GPP TS 33.501 V15.1.0", 3rd Generation Partnership Project; Technical Specification Group Services and System Aspects; Security architecture and procedures for 5G system (Release 15), (Jun. 2018), 185 pgs.

"ETSI TS 102 941", Intelligent Transport Systems (ITS); Security; Trust and Privacy Management, (May 2018), 71 pgs.

"3GPP TS 33.501", Technical Specification Group Services and System Aspects; Security architecture and procedures for 5G system, (May 2019), 191 pgs.

"Intel Secure Device Onboard Simplifies the Supply Chain", https: www.intel.com content www US en internet-of-things-secure-device-onboard.html, (accessed Dec. 11, 2020), 6 pgs.

"2019 Predictions: Customer Trust and User Experience Critical across Automated Vehicles, AI, 5G and Connected Solutions Mobility", Strategy analytics https: www.strategyanalytics.com access-services service-providers service-providers-strategies complimentary report-detail 2019predictions, 12 pgs.

"Vehicle-to-Vehicle Communications: Readiness of V2V Technology for Application", U.S. National Highway Traffic Safety Administration, (Aug. 2014), 327 pgs.

"European commission—Certificate Policy for Deployment and Operation of European Cooperative Intelligent Transport Systems", Release 1.1, (Jun. 2018), 81 pgs.

Brickell, Ernie, "Enhanced Privacy ID from Bilinear Pairing for Hardware Authentication and Attestation", IEEE International Conference on Social Computing IEEE International Conference on Privacy, Security, Risk and Trust, (2010), pp. 768-775.

Calandriello, Giorgio, "Efficient and robust pseudonymous authentication in VANET", In Proceedings of the fourth ACM international workshop on Vehicular ad hoc networks (VANET'07) DOI= http: dx.doi.org 10.11451287748.1287752, (2007), 19-28.

Freudiger, J, "Mix-zones for location privacy in vehicular networks", In Proc. Int. Workshop WiN-ITS, (2007), pp. 1-7.

* cited by examiner

US 11,490,249 B2

SECURING VEHICLE PRIVACY IN A DRIVING INFRASTRUCTURE

TECHNICAL FIELD

Embodiments described herein generally relate to self-driving or assisted driving vehicle technologies and more specifically to securing vehicle privacy in a driving infrastructure.

BACKGROUND

Vehicle-to-everything (V2X) is a communication model for information exchange between entities in vehicular environments. Such entities may include vehicles, road side units (RSUs) or other infrastructure elements, and pedestrians (e.g., via worn or carried mobile devices) among others. V2X information may augment data collected by onboard sensors (e.g., radar, lidar, ultrasonic, camera, etc.) used for autonomous driving) to enable vehicles to better model environments beyond the range of onboard sensors.

Due to the often important reliance on V2X data, some safeguards may be used to ensure that false V2X data (e.g., provided by a malicious entity as part of an attack) isn't accepted by the vehicle. To ensure authenticity and to trust V2X messages, generally a root of trust is established through a Public Key Infrastructure (PKI) implementation. Here, the true identity of the vehicles is authenticated and then vehicles are provided with pseudonym certificates or authentication tickets to protect their identity while interacting with other entities on the road. Thus, while the infrastructure may always identify the source of messages, and other entities may be able to verify which pseudonym sent information, the actual identity of any given vehicle may be obfuscated from the other entities.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
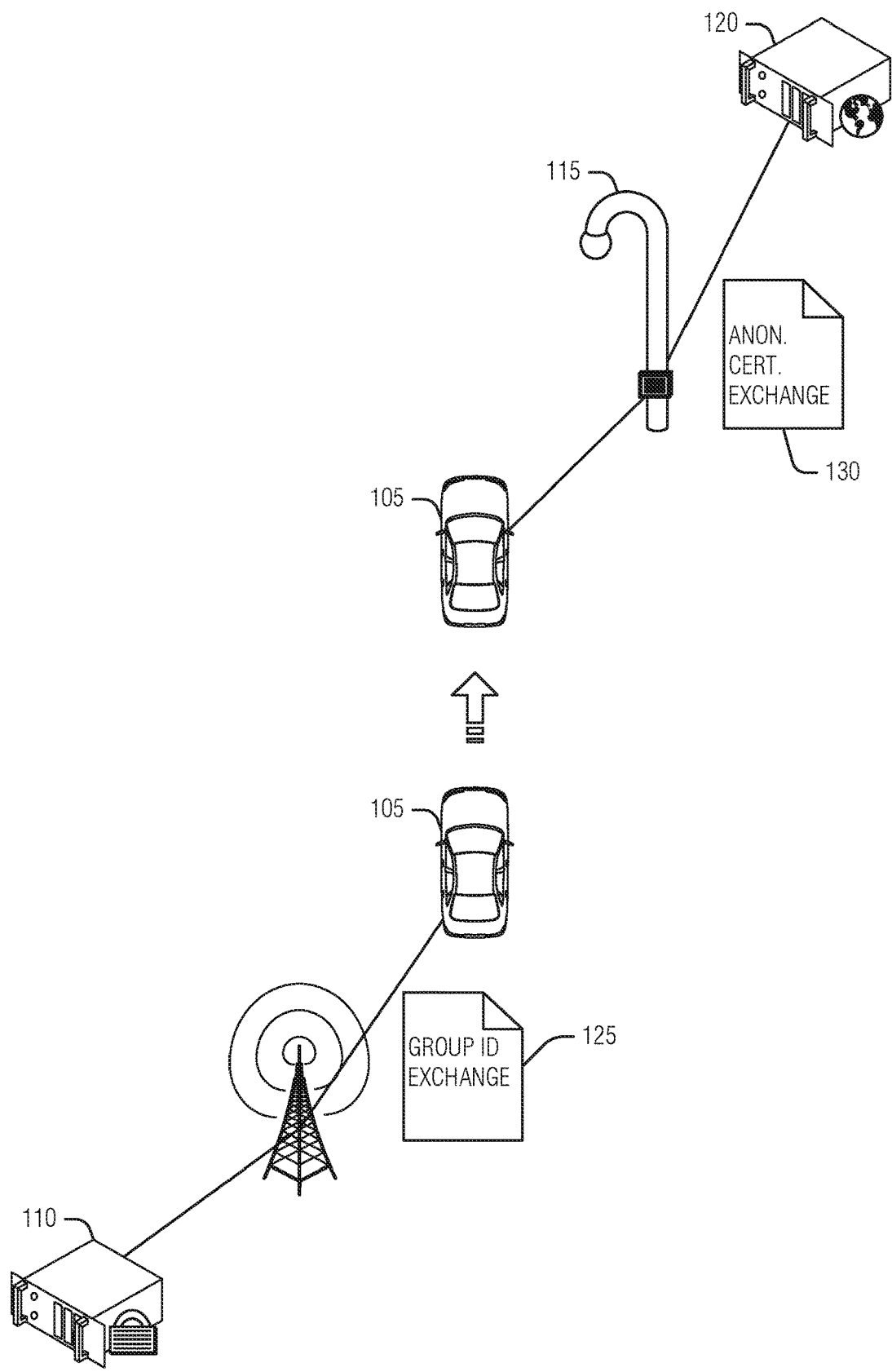
FIG. 1 illustrates an example of an environment with a system to secure vehicle privacy in a driving infrastructure, according to an embodiment.

Some V2X implementations allow a possible disclosure of the vehicle's (and thus perhaps the driver's) identity. Specifically, because the vehicle's pseudonyms may be linked to the real identity by the driving infrastructure, operators of the driving infrastructure are able to reveal the true identity of any given vehicle. Such discovery may, for example, enable driving infrastructure operations to track vehicle movements, or sell the vehicle identities to third parties. Thus, privacy becomes a concern for consumer adoption of V2X technology in driving infrastructures.

Existing and proposed approaches for V2X communications, such as Institute of Electrical and Electronics Engineers (IEEE) 802.11-based dedicated short-rang communication (DSRC) and cellular-based V2X (4G LTE and 5G) provide different privacy protection levels of the identity of the participating vehicles. In DSRC, vehicles are assigned time-changing pseudonym certificates, called authentication tickets, to hide their identity during V2X communications. The identity of the vehicle is however disclosed at the enrollment phase. In LTE's Evolved Packet System—Authentication and Key Agreement protocol (EPS AKA), the International mobile subscriber identity (IMSI) of the user is always sent unencrypted—and thus exposed publicly to attach to the network. The 5G Authenticated Key Agreement protocol (5G-AKA) on the other hand does encrypt this information before transmitting it by using the home network (FIN) public key provisioned during the subscriber identity module (SIM) card registration. The vehicle identity is however still disclosed to the authentication authority during initial attachment to the network.

In the scientific community improvements to the pseudonym approach have been proposed to limit the attack surface of potential vehicle identity leaks. For example, it has been proposed that group signatures be used to enable vehicles to generate and certify their own pseudonyms. Also, a proposal has been made to use 'Mix-zones' to swap pseudonyms at intersections between vehicle. Further, in the context of Internet of Things (IoT), 'Secure Device Onboarding' (SDO) proposed by Intel Corporation has been used to leverage Enhanced Privacy IDs (EPIDs)—provisioned during manufacturing to enable the automatic attachment of IoT devices to their respective service providers without disclosing their identity.

These approaches to vehicle privacy assurance have a few issues. For example, DSRC V2X approaches often provide pseudonymity instead of anonymity as defined in International Organization for Standardization (ISO) and the International Electrotechnical Commission (IEC) (ISO/IEC) 15408-2 "Information technology—Security techniques—Evaluation criteria for IT security Part—2: Security functional components". This means that, with pseudonymity, the central authorities which provide the pseudonyms have the capability to disclose the true identity of a vehicle. The PKI system in U.S. DSRC attempts to avoid the authority single-point-failure for insider attacks by using two authorities for linkage of pseudonyms, but a privacy revealing attack is still possible with either authority.

Cellular-based V2X does not protect the vehicle identity from exposure because the vehicle is always disclosed to the home network for legal intercept. Thus, current infrastructure-assisted approaches using Cellular V2X provide a double attack surface to reveal the vehicle's identity: 1) the cellular operator; and 2) the infrastructure services provider.

The group-based authentication proposed, mentioned above, uses a group-signature scheme that enables the group manager to reveal the identity of the private key used. Furthermore, it is proposed for Vehicular Ad-hoc Networks (VANETs) which poses the following challenges for its practical implementation: 1) the election of a group leader is difficult in vehicle-to-vehicle (V2V) ad-hoc networks; and 2) the group formation is challenging due to high-mobility and network topology changes. Another challenge in using group-based signatures, such as EPID in the V2X context, is the increased computational overhead. Anonymous identity attestation in ad-hoc V2X is often too computationally expensive due to the high frequency authentication signature creation. Further, a direct application of SDO is often not adequate in infrastructure-assisted V2X because the membership of vehicles to a roadside infrastructure network is dynamic. In contrast, IoT devices are expected to have a single static EPID private key during their lifecycle, whereas vehicles should be provided with EPID private keys in an on-demand basis. Also, while the EPID private keys may provide anonymity to registered joining vehicles, the vehicle's traveled path information is not protected from external observers that may attempt to track them. The use of certificate pseudonyms to authenticate transmitted messages after initial attachment is still useful for V2X messages to satisfy very tight latency requirements of safety applications that the expensive computation of EPID-based signatures might violate.

To address these concerns, a system is described herein where a vehicle registers with a trusted authentication entity (e.g., provider, group, party, etc.) to receive a group identification, such as an EPID private key. The group ID is then used during vehicle attachment to a driving infrastructure to receive pseudonym certificates to use when interacting with the vehicle infrastructure or other vehicles. In an example, to ensure ongoing anonymity, the pseudonym certificates are periodically refreshed. Such a system provides a unique and truly anonymous vehicle identifier, while ensuring that the vehicle's identity privacy by decoupling the dynamic membership registration of a vehicle to the driving infrastructure from the initial attachment procedure to access the infrastructure services using group signatures. When using a group ID such as an EPID, the roadside infrastructure may provide individualized services, track the vehicle's movement, or revoke access of misbehaving vehicles without ever knowing the vehicle's true identity. Additional examples and details are provided below.

FIG. 1 illustrates an example of an environment with a system to secure vehicle privacy in a driving infrastructure, according to an embodiment. As illustrated, the environment includes a trusted authentication entity 110, a vehicle 105, and a driving infrastructure that includes an RSU 115 as part of a roadside network and a server 120 to coordinate among RSUs.

The vehicle 105 includes processing circuitry that is configured (e.g., hardwired or via software) to perform a variety of operations with regard to the two-stage membership and attachment procedure. Thus, the vehicle 105 is configured to contact a group ID issuer (e.g., trusted authentication entity 110) to register the vehicle as a member to the driving infrastructure. If complete, the registration enables the vehicle to attempt an attachment when, for example, entering a roadway over which the driving infrastructure maintains a roadside network.

In an example, contacting the group ID issuer includes using a vehicle ID to register as the member. Here, the vehicle ID may be a serial number, vehicle identification number (VIN), or other unique identifier common to vehicles. In an example, a secure vehicle ID, such as a cryptographic private key installed in the processing circuitry of the vehicle at the time of manufacture may be used. Such a cryptographic identity may be harder to fake should a malicious entity desire to spoof a legitimate vehicle.

The trusted authentication entity 110 may perform a number of checks on the membership request by the vehicle 105. For example, the trusted authentication entity 110 may maintain a count, or frequency, of membership requests in order to determine whether the vehicle 105 is acting like other vehicles (e.g., in accordance with statistical models of vehicle behavior) or not. If the vehicle 105 appears to be an outlier, the membership may be denied. However, assuming the membership is accepted, the trusted authentication entity 110 may create a group ID 125 and deliver it to the vehicle 105. Thus, the vehicle 105 is configured to receive the group ID 125 from the group ID issuer to indicate acceptance as a member.

In an example, the group ID 125 comprises an asymmetric key pair. Here, a private key of the key pair is unique to the vehicle 105, and a public key of the key pair is common to several private keys including the private key unique to the vehicle 105. In an example, the group ID 125 is simply the private key of the pair. Such a private key may still be used to provide the group signature for later attachment operations. In an example, the group ID 125 conforms to an Enhanced Privacy ID (EPID). EPID—and similar group ID systems—enables the trusted authentication entity 110 to match a signature to the specific private key issued to the vehicle 105. This may enable more robust monitoring of suspicious vehicles and the ability for the trusted authentication entity 110 to blacklist vehicles even when the group signature does not provide the driving infrastructure with any details about the vehicle's identity.

Once the vehicle 105 has the group ID 125 in hand, the vehicle 105 is configured to contact the driving infrastructure (e.g., server 120 via the RSU 115) to attach to the driving infrastructure. Here, the vehicle 105 uses the group ID 125 to identify the vehicle 105 to the driving infrastructure 115, 120. The driving infrastructure 115, 120 may then contact the trusted authentication entity 110 to ascertain whether or not the vehicle 105 is a member. The driving infrastructure 115, 120 may also ascertain whether or not the vehicle 105 is on a blacklist due to, for example, malicious data behavior (e.g., sending false data) or driving behavior (e.g., driving erratically), among other reasons. If the vehicle 105 is not a member or is blacklisted, the driving infrastructure 115, 120 may notify the vehicle 105 of this condition or may simply not reply. Not replying may conserver infrastructure resources and also retard an attack on the infrastructure.

If, however, the driving infrastructure 115, 120 allows the attachment of the vehicle 105, the driving infrastructure 115, 120 generates an attachment ID 130 for the vehicle 105. Thus, the vehicle 105 is configured to receive the attachment ID 130 from the driving infrastructure. As noted elsewhere, the attachment ID 130 is used to secure communications between the vehicle 105 and the driving infrastructure 115, 120 while maintaining anonymity for the true identity of the vehicle 105. The elements of the driving infrastructure 115, 120 that may use this attachment ID 130 for the vehicle 105 include the RSU 115, the server 120, and other vehicles participating in a V2X driving infrastructure.

In an example, the attachment ID 130 is a pseudonym ID for the vehicle. This pseudonym may also include certificates and public-private key pairs for the vehicle 105. In an example, the vehicle 105 may periodically obtain a new pseudonym ID that is different than a previous pseudonym ID for the vehicle 105 from the driving infrastructure. Periodically exchanging the attachment ID 130 helps to prevent vehicle tracking by third parties.

Figure 2:
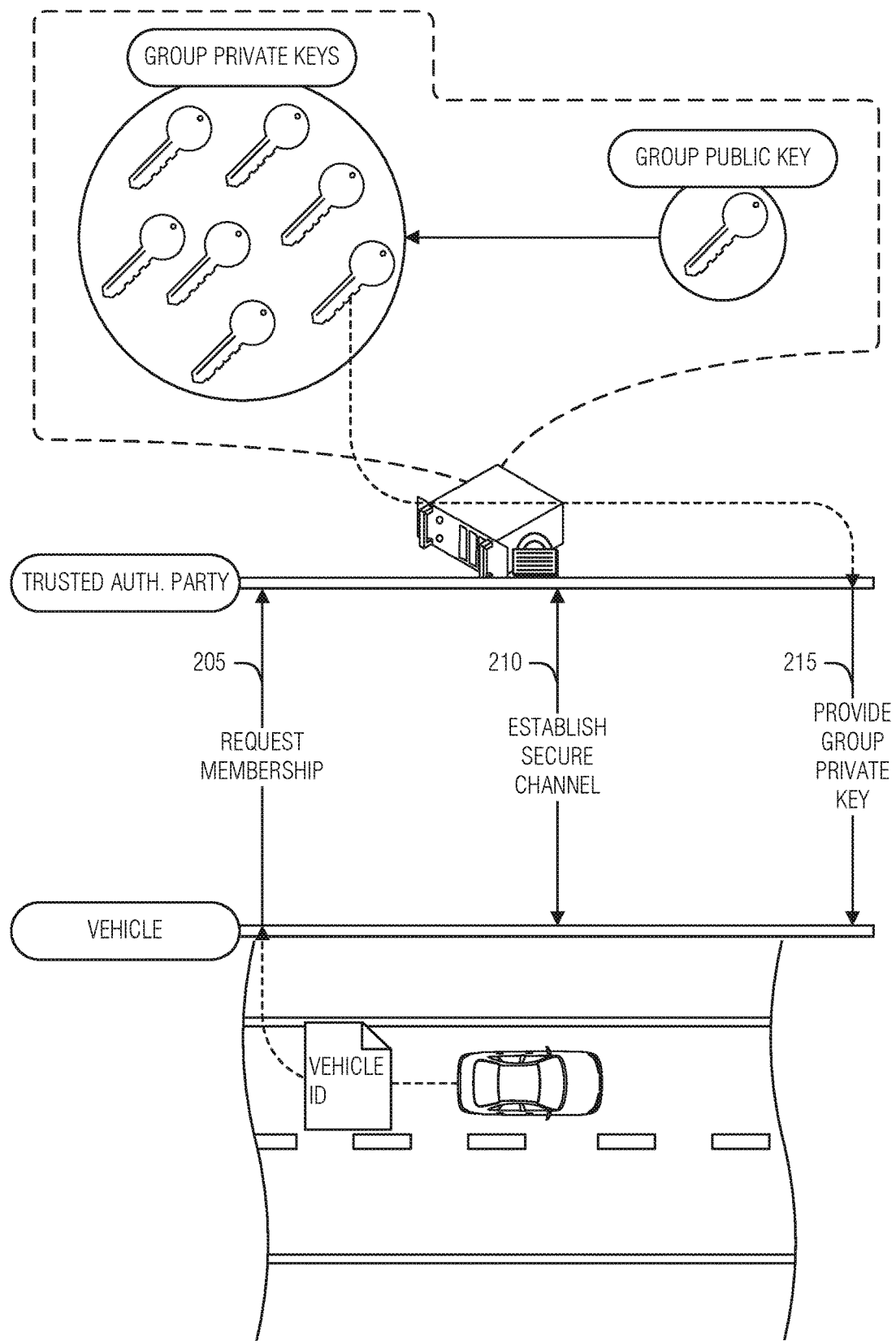
FIG. 2 illustrates an example of vehicle registration, according to an embodiment.

FIG. 2 illustrates an example of vehicle registration, according to an embodiment. This registration may be referred to as a membership registration stage. Here, the true identity of the vehicle (e.g., vehicle ID, such as a vehicle identification number (VIN)) may be used for the registration. The result of this stage is provision of a group ID, such as an EPID private key, that the vehicle may use for future anonymous authentication to a driving infrastructure.

As illustrated, a vehicle, before attempting to attach to a driving infrastructure, requests to be part of infrastructure network providing a trusted ID (e.g., vehicle ID) for authentication to a trusted authentication party (message 205). A secure (e.g., encrypted) channel is established (message exchange 210), This channel is used to provide a group ID to the vehicle (message 215). This group ID may then be used by the vehicle when trying to attach to the driving infrastructure (e.g., roadside network). In an example, an SDO using a vehicle-specific EPID may be used as the trusted vehicle ID.

Figure 3:
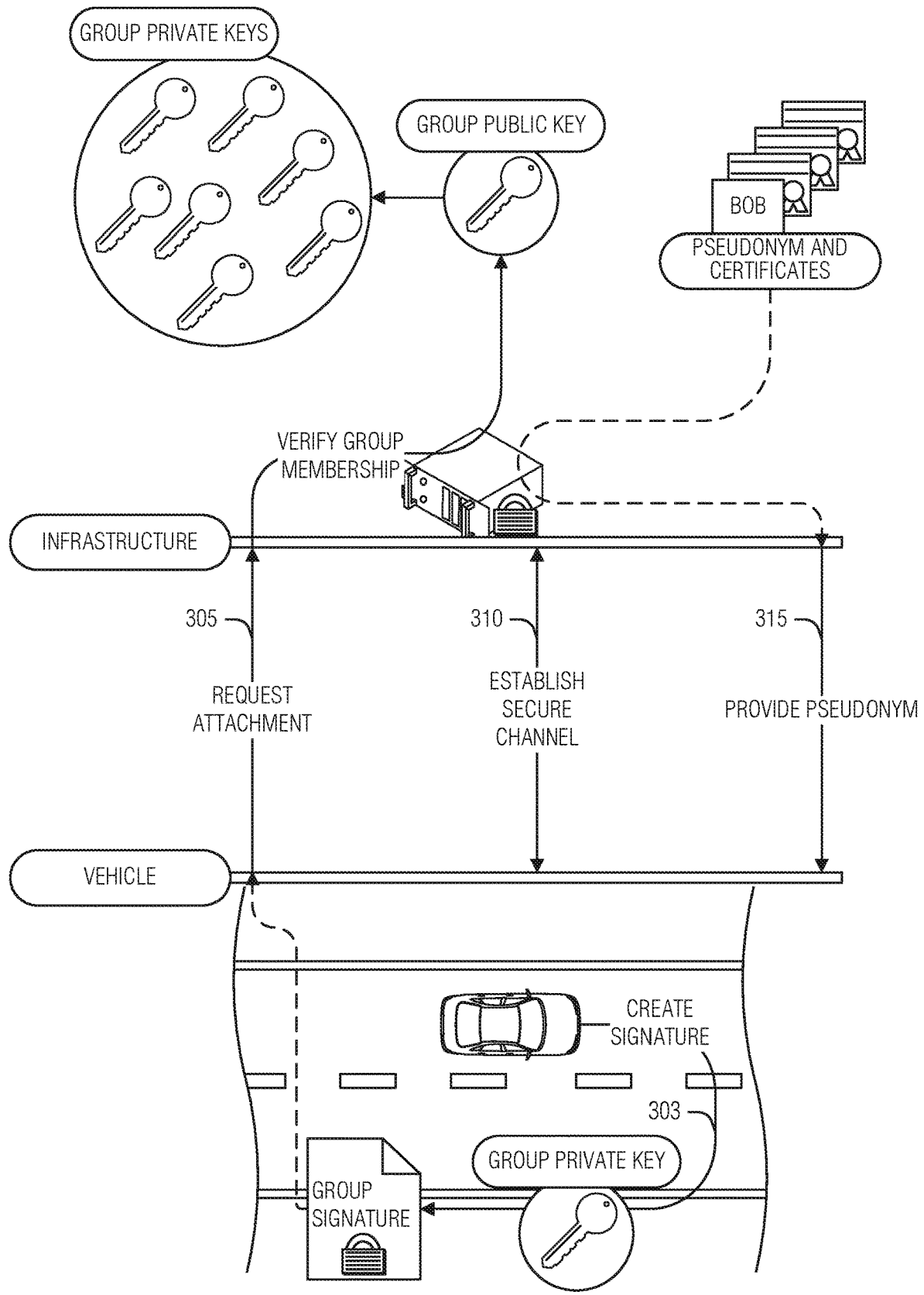
FIG. 3 illustrates an example of vehicle attachment to a driving infrastructure, according to an embodiment.

FIG. 3 illustrates an example of vehicle attachment to a driving infrastructure, according to an embodiment. After having received the group ID at membership registration, the vehicle may anonymously request to join the driving infrastructure network using its group ID. By the nature of group IDs, the driving infrastructure is limited to being able to verify that the signature belongs to one of the group member keys, but not which specific member of the group. The driving infrastructure may, upon verification of the vehicle's membership in the group, provide the vehicle with an initial pseudonym for future communication handshakes.

As illustrated, this attachment stage proceeds with the creation, by the vehicle, of a group signature using the group private key (operation 303). The vehicle may then request attachment to the driving infrastructure at, for example, an RSU (message 305). A secure channel may be established between the vehicle and the driving infrastructure (message exchange 310), the driving infrastructure using the group signature to anonymously authenticate the vehicle. The driving infrastructure then provides a pseudonym ID and a set of pseudonym certificates for future communication handshakes (message 315). After the initial attachment procedure, the vehicle may be able to further protect its privacy by using and changing its pseudonym id and certificates. As noted above, because the driving infrastructure doesn't know the vehicle's true identity, the pseudonym identity cannot be associated to the vehicle's true identity because it is unknown to the driving infrastructure.

Figure 4:
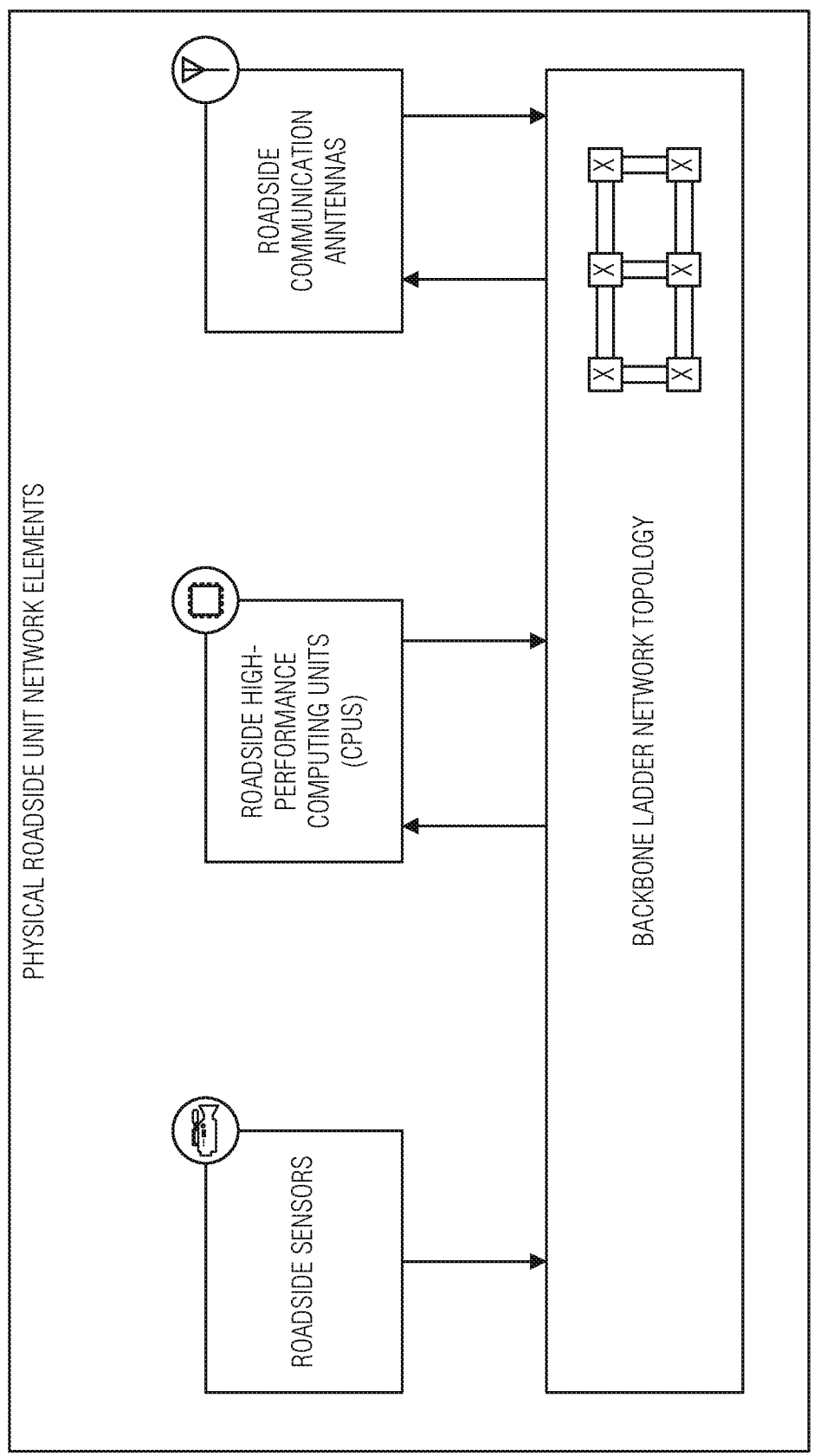
FIG. 4 is a block diagram of examples of roadside network elements, according to an embodiment.

FIG. 4 is a block diagram of examples of roadside network elements, according to an embodiment. Collaborative automated driving enables extension of the capabilities and safety of automated vehicles by the prompt exchange of information about driving intentions or environmental situations. This enables vehicles to make better informed driving choices. However, vehicular ad-hoc networks (e.g., VANETs) are often unable to guarantee a minimum level of visibility range beyond the vehicle's own sensors, thus VANETs generally do not provide a suitable solution for highly dependable communication of environmental conditions data. Driving infrastructure systems may provide automated vehicles with more dependable environmental information which may be an important aspect of vehicle safety in a cost efficient manner and may extend the vehicle visibility range beyond the limits of onboard sensors.

The components illustrated here are examples of a roadside infrastructure system that defines a physical roadside network with sensor, communication antennas, CPUs, and a backbone communication to interconnect these elements. These physical resources enable the driving infrastructure: 1) to monitor the road environment through roadside sensors; 2) to provide high-performance and low-latency computing resources for the processing of data; or 3) the distribution of environment information to or from vehicles through wireless communications.

Figure 5:
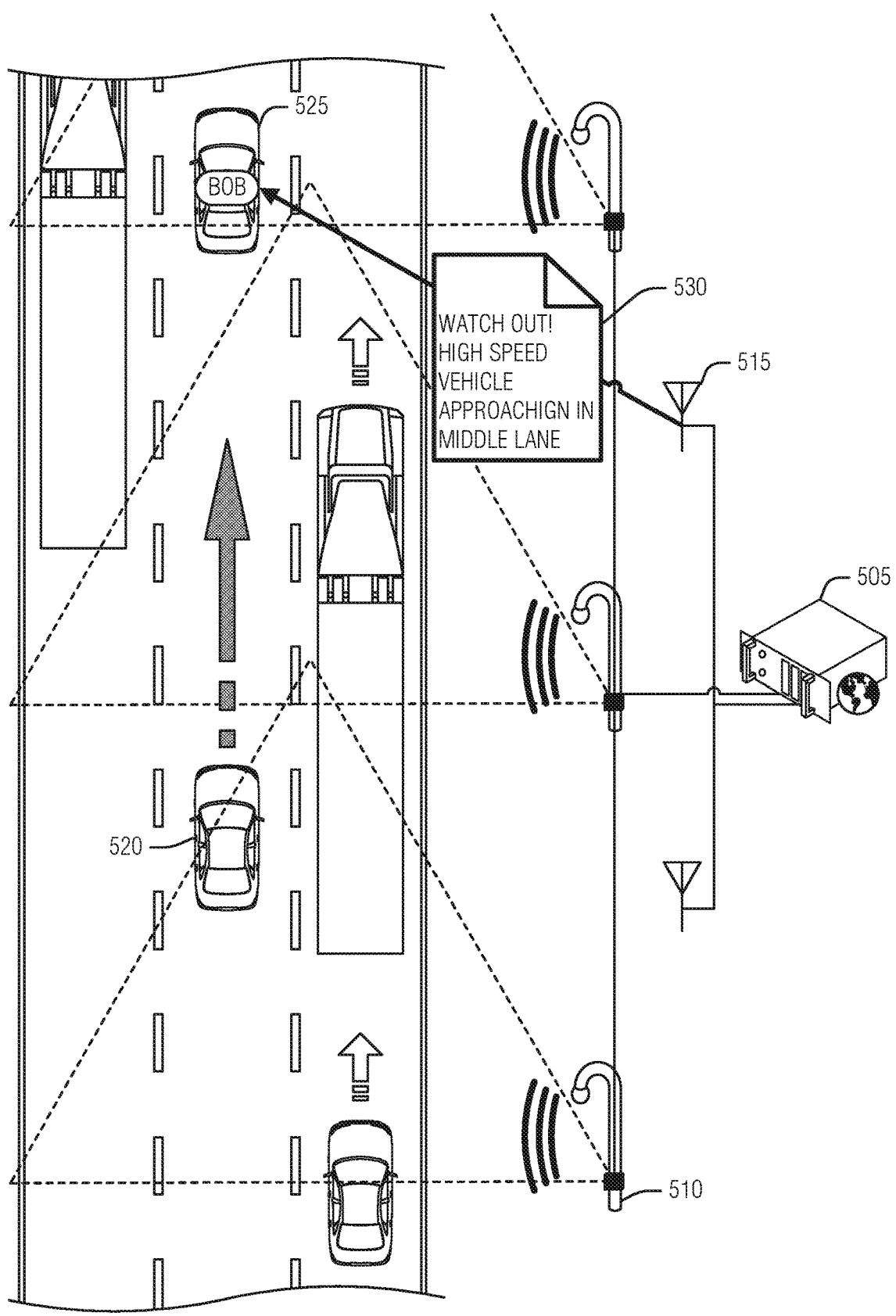
FIG. 5 illustrates an example of a use case in which a driving infrastructure addresses a vehicle by a pseudonym, according to an embodiment.

FIG. 5 illustrates an example of a use case in which a driving infrastructure addresses a vehicle by a pseudonym, according to an embodiment. In this scenario a driving infrastructure sensor (e.g., radar illustrated as dashed triangles) on an RSU 510 detects the excessive speed of a vehicle 520 as the vehicle 520 approaches member vehicle 525. As illustrated, the member vehicle 525 has been provided a pseudonym ID of 'Bob'. Upon recognizing the danger posed by the speeding vehicle 520 to the member vehicle 525, the infrastructure addresses—e.g., server 505 via remote radio head 515—the member vehicle 525 with a warning message 530 using its pseudonym 'Bob'. Here, because the member vehicle 525 used a group ID for attachment to the driving infrastructure, no entity, not even the driving infrastructure, knows the true identity of the member vehicle 525 with the pseudonym 'Bob'.

Figure 6:
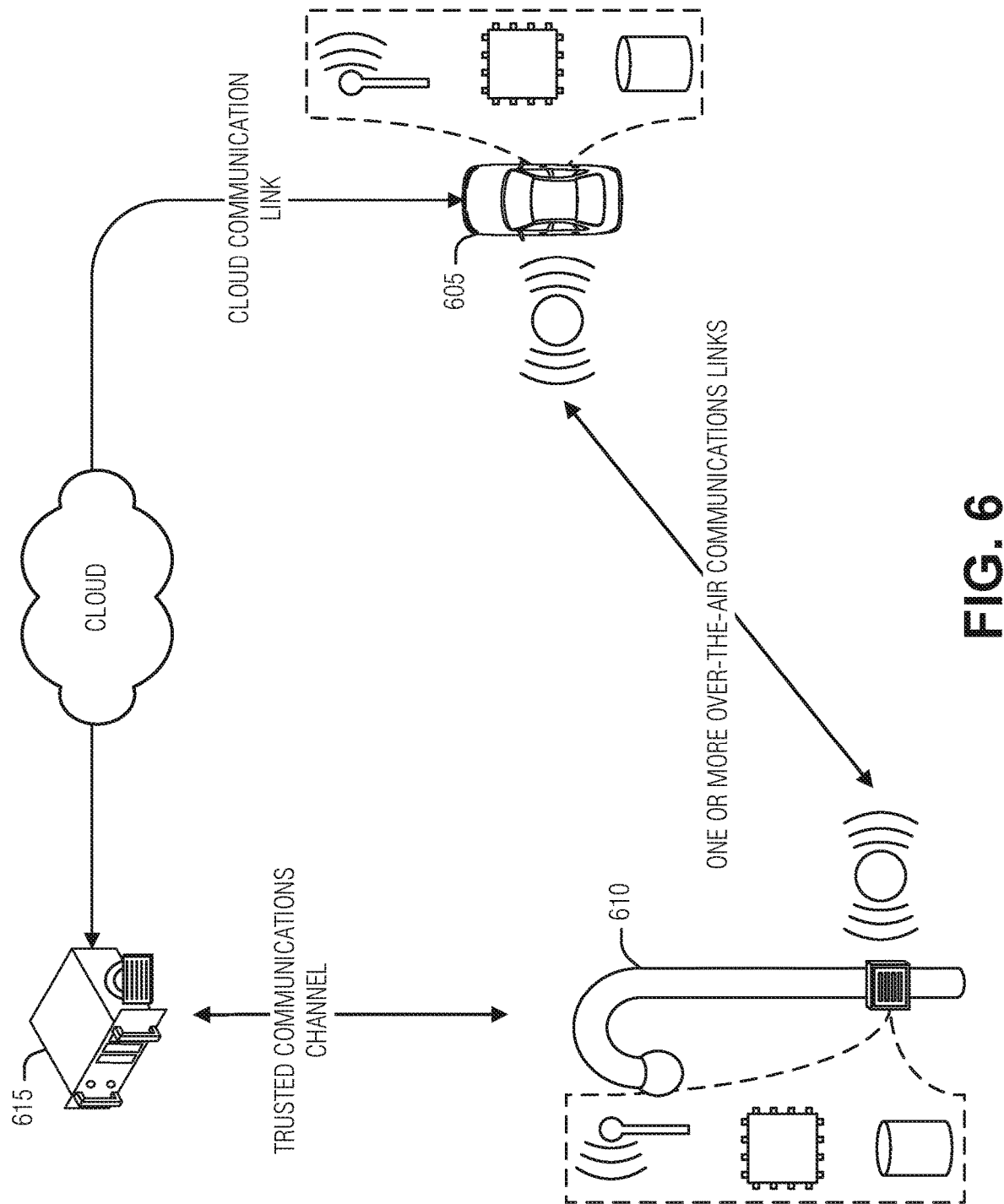
FIG. 6 illustrates an example of physical elements in a system to secure vehicle privacy in a driving infrastructure, according to an embodiment.

FIG. 6 illustrates an example of physical elements in a system to secure vehicle privacy in a driving infrastructure, according to an embodiment. The primary physical entities are a vehicle 605, a driving infrastructure unit 610 (e.g., RSU), and a trusted authentication entity 615. As illustrated, both the vehicle 605 and the RSU 610 include sensor, compute, and storage resources.

In urban or a highway operation, the RSU 610 may use its storage, computation, sensing, or wireless communication resources to provide the vehicle 605 with services for safety or traffic information applications. In an example, the RSU 610 communicates through a secure channel with the trusted authentication entity 615 to delegate the issue of public and private group keys, as well maintain group ID or revocation lists.

The RSU 610 is configured to monitor and track the movement of vehicles along the road, for example, using radar, or other sensors. Vehicles provisioned with computation and communication resources, such as the vehicle 605, may be configured to communicate or collaborate with the roadside infrastructure.

The communication between the trusted authentication entity 615 and the vehicle 605 may occur e.g., in whole or in part) over a cloud-based communication link. This link may be used by the vehicle 605 to obtain the group ID used when communicating with the RSU 610. The cloud-based link may use a cellular network to establish the physical connect from the vehicle 605 to the greater cloud network.

The communication between the RSU 610 and the vehicle 605 may occur through a single or multiple over-the-air links between the RSU 610 and the vehicle 605. Here, participating vehicles may be assumed to have already been provided with a trusted unique vehicle identifier (vID) for membership registration purposes. For example, this vID may be a cellular SIM card ID such as the international mobile subscriber identity (IMSI), or a VIN.

Some services provided by the driving infrastructure may ask for further vehicle data, such as hardware capabilities, preferences, etc., which might reveal the vehicle's identity. This however would be up for the vehicle to accept or decline.

Figure 7:
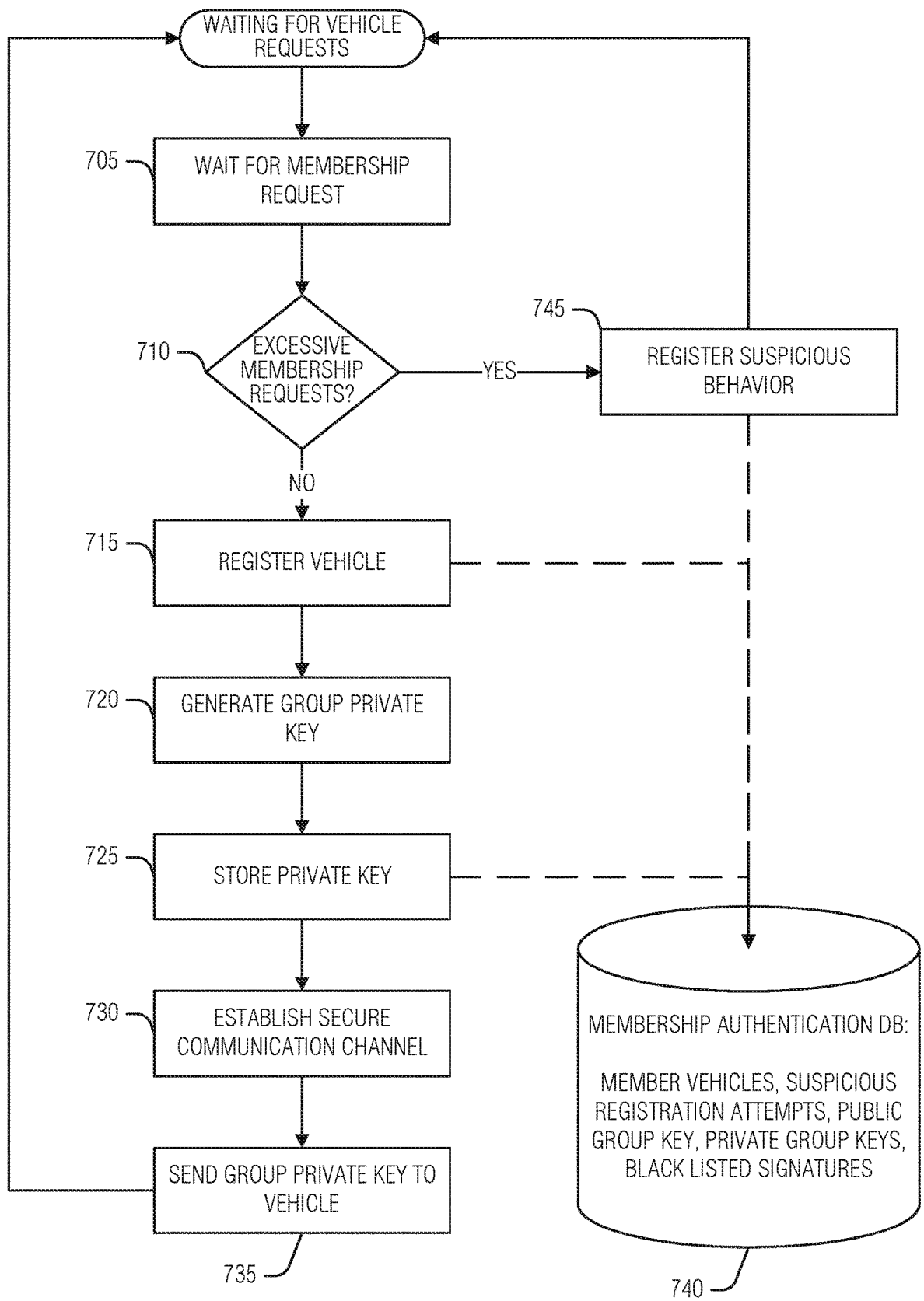
FIG. 7 illustrates a flowchart of a trusted authentication entity during vehicle membership, according to an embodiment.

FIG. 7 illustrates a flowchart of a trusted authentication entity during vehicle membership, according to an embodiment. Here, membership registration is performed between vehicles and the trusted authentication entity. The process flow starts with the trusted authentication entity in a state waiting for vehicle membership requests. Thus, the trusted authentication entity waits for a request (operation 705). When a request is received, the trusted authentication entity determines whether there are too many (e.g., measured by a threshold) requests from a vehicle (decision 710). If yes, register suspicious behavior of the vehicle in the membership authentication database and await a new request (operation 745).

If the vehicle does not have an excessive number of requests, the trusted authentication entity registers the vehicle and records the registration in the membership authentication database (operation 715). The trusted authentication entity may then proceed to generate a group private key for the vehicle (operation 720) and store it in the membership authentication database (operation 725).

The trusted authentication entity may establish a secure communication channel with the vehicle (operation 730). Once the vehicle is registered and the group ID (e.g., group private key) and the secure channel are established, the trusted authentication entity may transmit the group ID to the vehicle (operation 735) and proceed to wait for additional membership requests.

Figure 8:
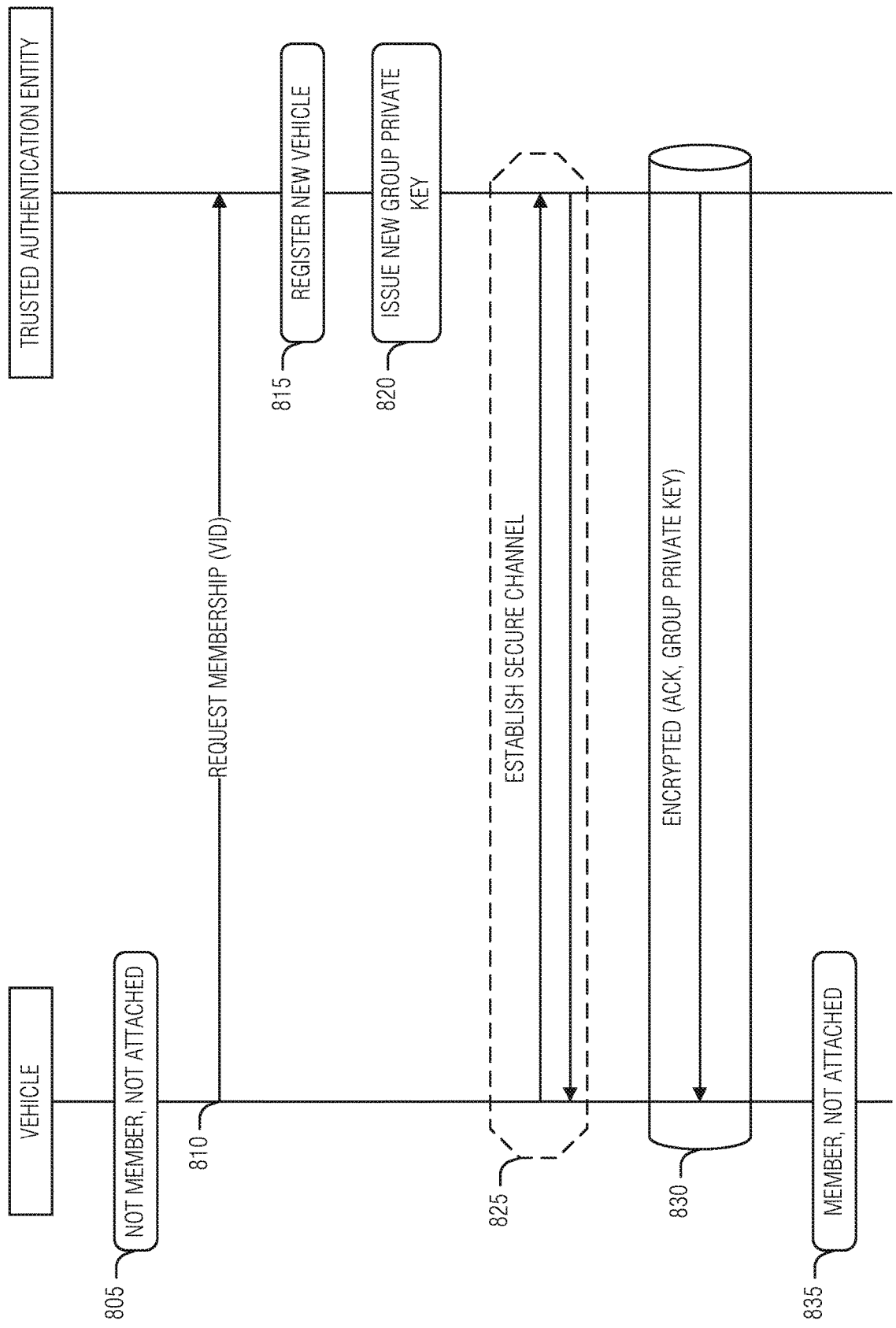
FIG. 8 illustrates a diagram of message flows between a vehicle and a trusted authentication entity during membership registration, according to an embodiment.

FIG. 8 illustrates a diagram of message flows between a vehicle and a trusted authentication entity (e.g., provider) during membership registration, according to an embodiment. The flow starts with the vehicle in a state 805 in which it is neither a member nor attached to a driving infrastructure. The vehicle creates a membership request message 810 to the trusted authentication entity, providing the vehicle's vID. This request 810 may be transmitted through the Internet, or other cloud, for example. In order to protect the vehicle identity, the vID may be transmitted through an already provisioned key, analogous to the 5G AKA protocol.

The trusted authentication entity records the vID (operation 815) in the list of vehicle members and issues a new group ID (e.g., EPID private key) (operation 820). A secure channel 825 is established between the vehicle and the trusted authentication entity. Then the trusted authentication entity acknowledges the request and sends the group ID to the vehicle (message 830). At this point, the vehicle is now a member of the network, but not yet attached (state 835).

Figure 9:
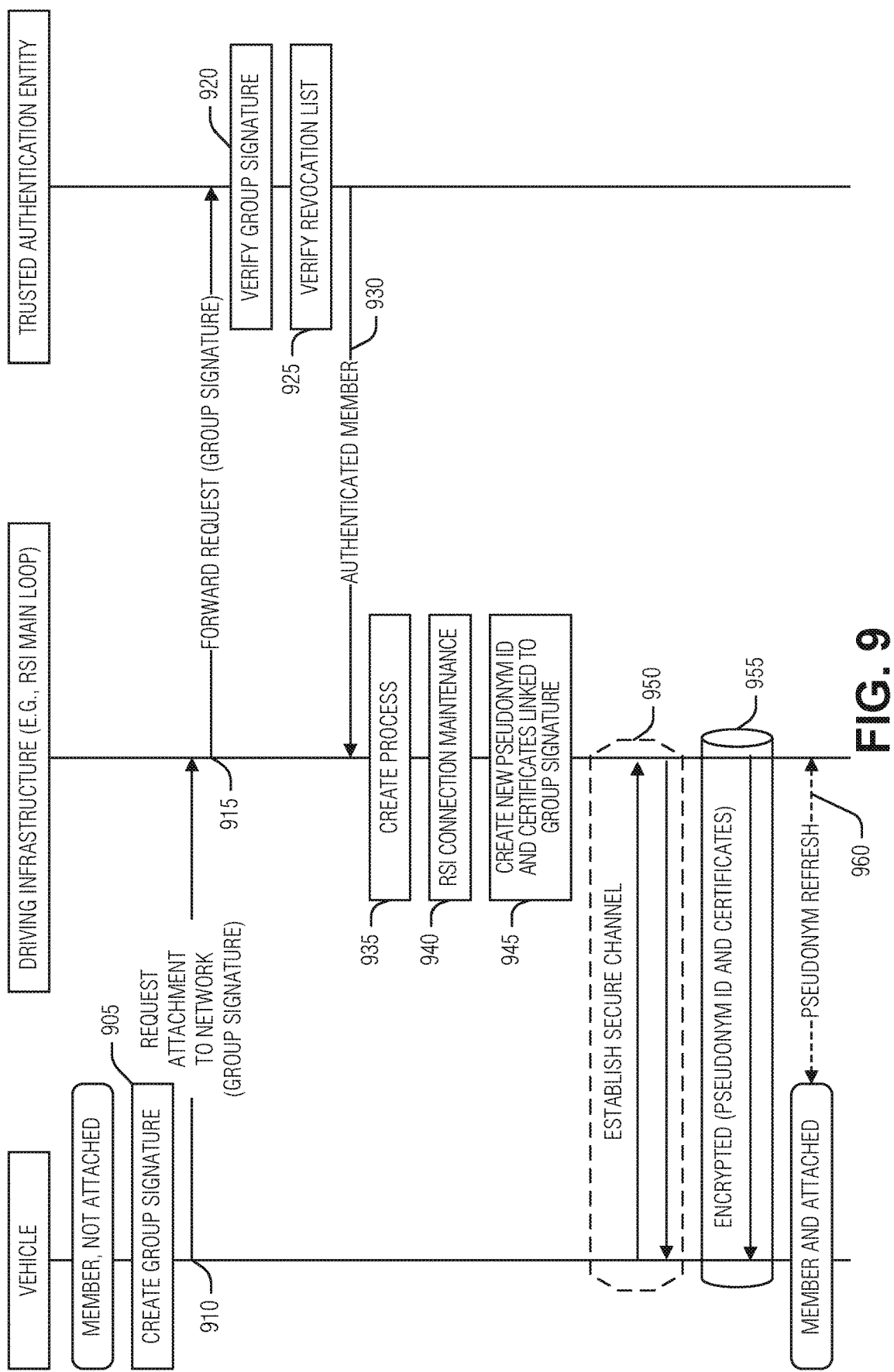
FIG. 9 illustrates a diagram of message flows between a vehicle, a roadside unit, and a trusted authentication entity during vehicle attachment to the driving infrastructure, according to an embodiment.

FIG. 9 illustrates a diagram of message flows between a vehicle, a roadside unit, and a trusted authentication entity during vehicle attachment to the driving infrastructure, according to an embodiment. The result of this attachment is provision of a pseudonym ID and pseudonym certificates from the driving infrastructure to the vehicle that are not linked to the vehicle's true identity.

The vehicle starts this interaction with a state of being a member but not yet attached to the driving infrastructure. Thus, the vehicle has already been registered to the driving infrastructure network, and is physically at a road (e.g., just joining or already inside the sector covered by the infrastructure) and would like to make use of the infrastructure services, creates and sends an attachment request (message 910). This request includes a group signature created (operation 905) with the vehicle's group ID (e.g., EPID private key).

The driving infrastructure receives this message (e.g., through a wireless link or through the cloud) and delegates the verification of the signature to the trusted authentication entity (message 915). If verification is successful the infrastructure now has been assured that the vehicle poses a valid group ID, although it cannot identify which private key signed the message.

The trusted authentication entity verifies the signature (operation 920) and also checks whether the signature has been blacklisted in its own revocation list (operation 925). This blacklist is a data structure populated with signatures from vehicles that demonstrated malicious behavior—such as atypical communications patterns (e.g., flooding attempts, or DoS attacks), dangerous maneuvers, transmission of false information about the road environment, etc.—in the past.

If verification passes, the trusted authentication entity communicates this success to the driving infrastructure (message 930). The driving infrastructure may then start the attachment process (operation 935) in which a new temporal (e.g., renewable, temporary, etc.) pseudonym ID is created for the vehicle (operation 945). The pseudonym and the corresponding signature are stored by the infrastructure to allow attachment revocation if malicious behavior is identified. This process may also include a process to maintain the connection (operation 940), which may include issuing new pseudonyms periodically.

The trusted authentication entity and the vehicle may establish a secure communication channel 950, and then the pseudonym ID and pseudonym certificates may be sent to the vehicle (message 955). Any further communications between the infrastructure and the vehicle may now use the pseudonyms to address the originator or receiver of a message or to sign messages for authentication.

At this point, the vehicle state is a member that is attached. Thus, the vehicle is both a member and an attached agent in the roadside network. In an example, the pseudonym ID and certificates are refreshed (e.g., updated) (exchange 960) to protect the tracking of the vehicle from outsiders.

Figure 10A:
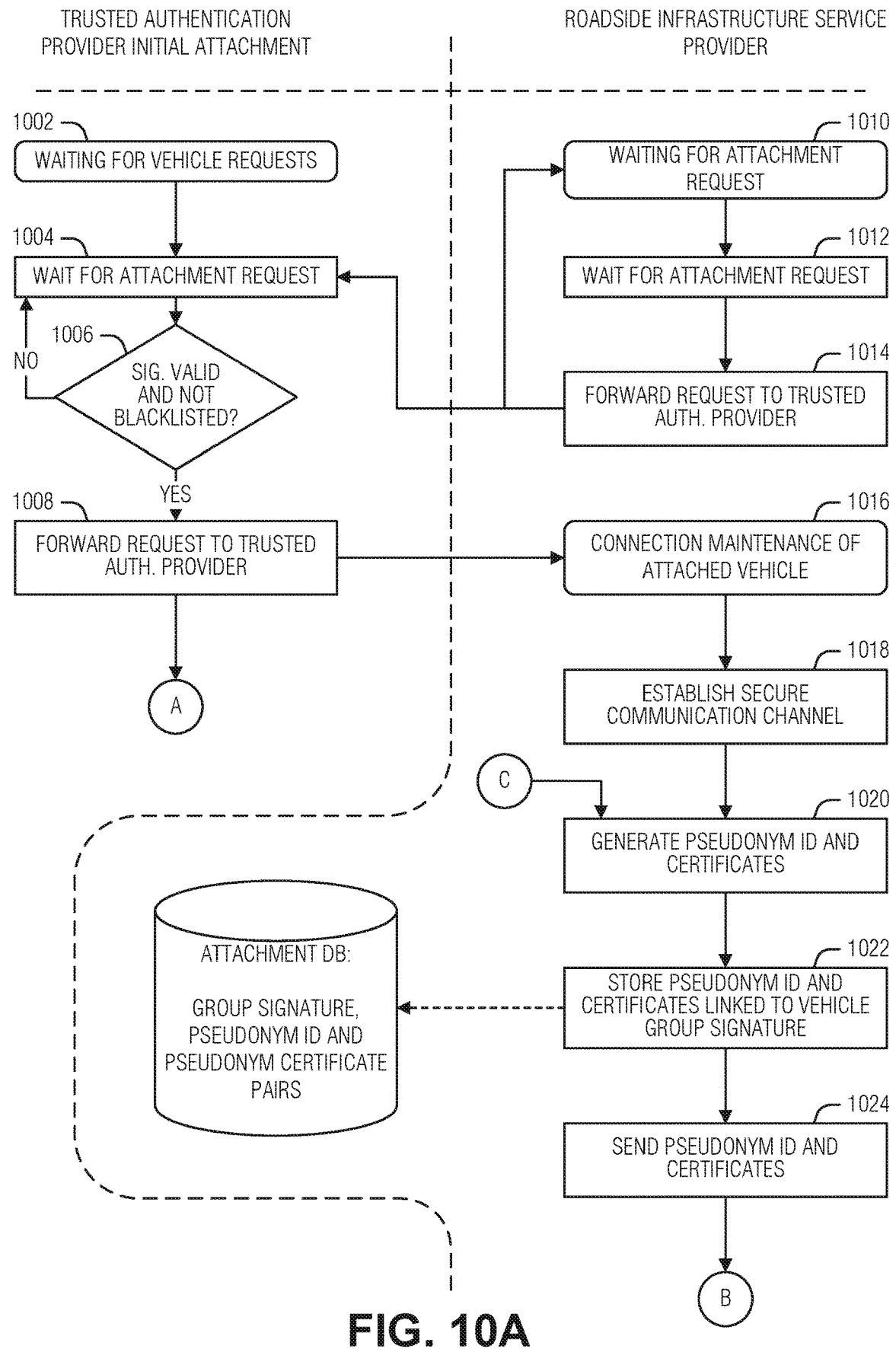
FIGS. 10A-10B illustrate a flowchart of a trusted authentication entity and a driving infrastructure during vehicle attachment to the driving infrastructure, according to an embodiment.
Figure 10B:
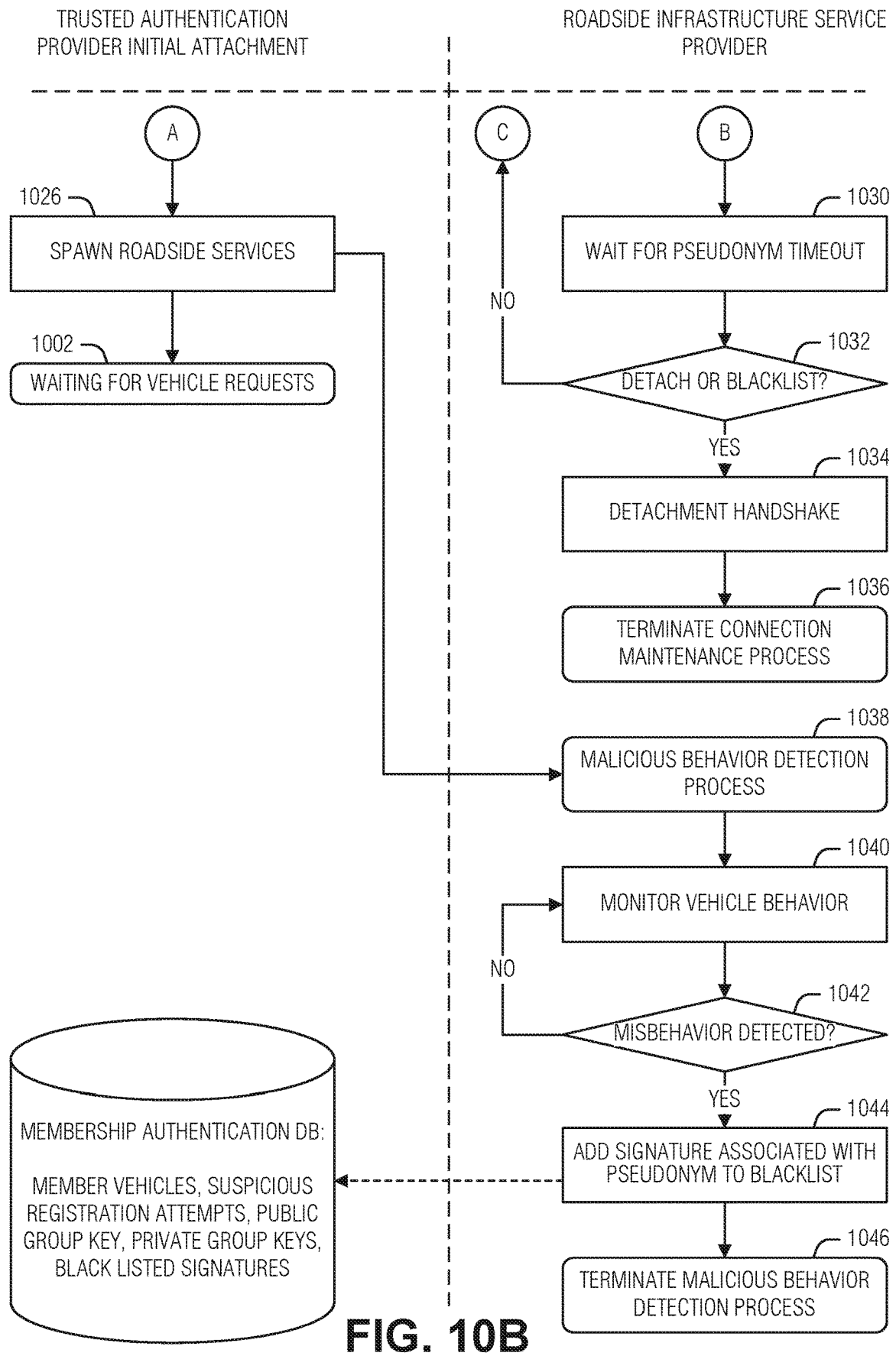

FIGS. 10A-10B illustrate a flowchart of a trusted authentication entity and a driving infrastructure during vehicle attachment to the driving infrastructure, according to an embodiment. Initial attachment of vehicles joining the road is performed between vehicles and the roadside infrastructure together with the trusted authentication entity. The trusted authentication entity has an initial state 1002 waiting for vehicle requests, and the driving infrastructure has an initial state 1010 of waiting for a vehicle attachment request. The infrastructure receives an attachment request 1012 and forwards it on to the trusted authentication entity 1014. The driving restructure then awaits an additional attachment request.

Upon receiving the attachment request 1004, the trusted authentication entity determines whether the signature is valid for the group and that the vehicle is not blacklisted (decision 1006). If either the signature is invalid, or the vehicle is blacklisted, the trusted authentication entity does not respond to the driving infrastructure and awaits another verification request. If both the signature is valid and the vehicle is not blacklisted, the trusted authentication entity communicates this to the driving infrastructure 1008 and may spawn road side services 1026.

Upon verification of the group ID, the driving infrastructure starts a connection maintenance process 1016 for the vehicle and establishes a secure channel with the vehicle 1018. The driving infrastructure also generates pseudonym IDs and certificates for the vehicle 1020, which are then stored 1022 in an attachment data structure. The pseudonym ID and certificates are then sent 1024 to the vehicle.

The driving infrastructure may timeout the pseudonym information 1030 and decide whether to detach or blacklist the vehicle. If neither of these actions are taken, the infrastructure may generate new pseudonym data for the vehicle. If the vehicle will be detached, the driving infrastructure initiates a detachment handshake 1034 and terminates the connection to the vehicle 1036.

The driving infrastructure may also have a state 1038 to monitor the vehicle for malicious behavior. In this state, the infrastructure may monitor the vehicle behavior 1040. If malicious behavior is detected (decision 1042), the driving infrastructure may record 1044 the vehicle signature in a membership data structure held by the trusted authentication entity for future blacklist maintenance. The driving infrastructure may then terminate the connection to the vehicle 1046.

Figure 11:
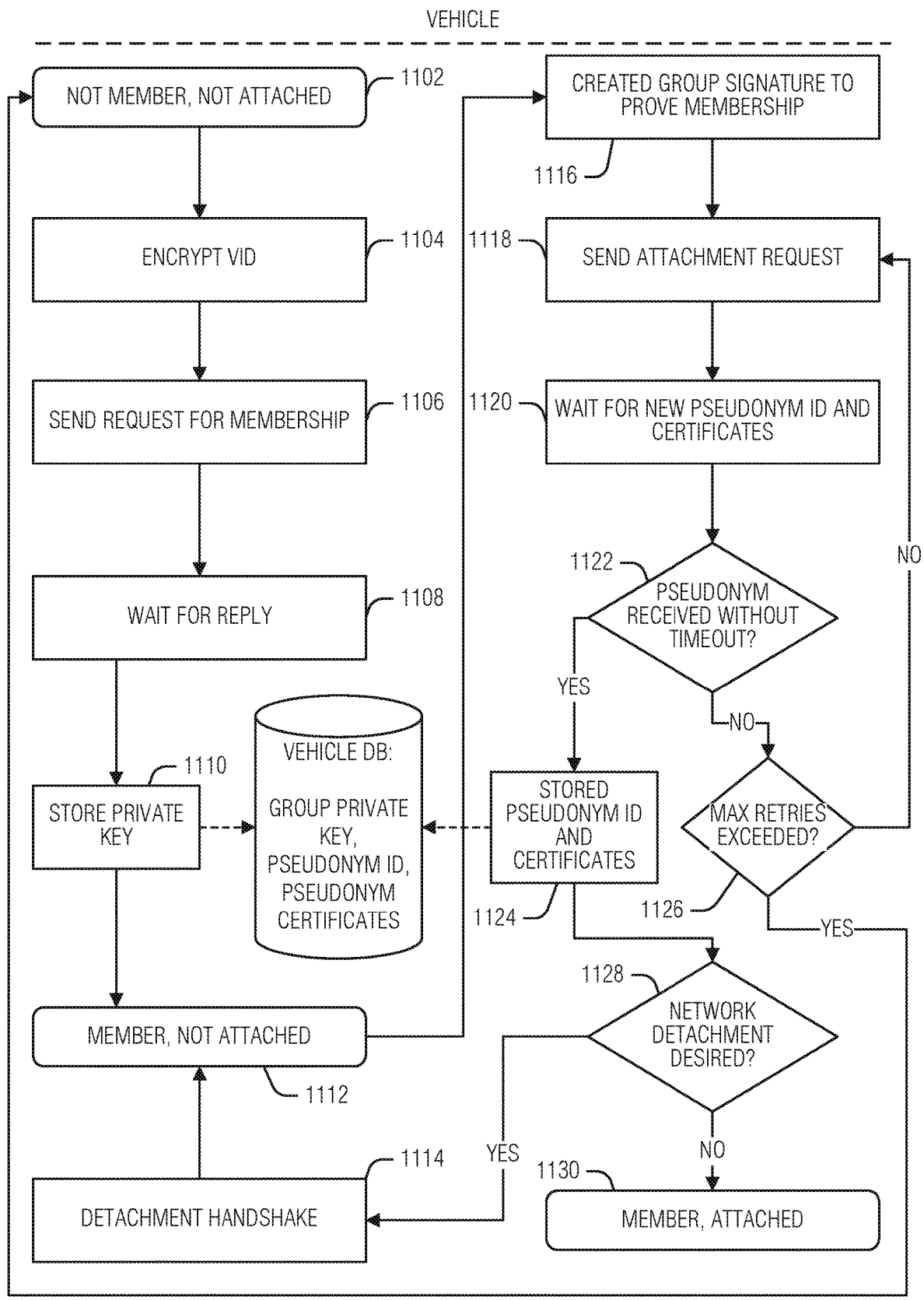
FIG. 11 illustrates a flowchart of a vehicle during membership registration with a trusted authentication entity and attachment with a driving infrastructure, according to an embodiment.

FIG. 11 illustrates a flowchart of a vehicle during membership registration with a trusted authentication entity and attachment with a driving infrastructure, according to an embodiment. The vehicle has an initial state 1102 of not being a member nor being attached to a driving infrastructure (e.g., roadside network). The vehicle may encrypt a vID 1104, such as its VIN, send a membership request 1106 to a trusted authentication entity, and wait for a reply 1108. The vehicle upon receipt of the replay, stores 1110 the group ID (e.g., group private key) in its vehicle data structure and transitions to the state 1112, member, not attached.

From this state, the vehicle may create a group signature 1116 and send an attached request 1118 to a roadside network using the group signature to authenticate the vehicle. Upon receiving new pseudonym information 1120, the vehicle determines whether they are valid based on, for example, a timeout (decision 1122), If they are not valid, a maximum retry evaluation (decision 1126) is made. If there have been too many retries, the vehicle transitions back into its initial state 1102. If not, the vehicle sends another attachment request 1118.

If the pseudonym data is accepted, it is stored 1124 in the vehicle data structure and the vehicle decides 1128 whether it wants to detach from the roadside network. If no, the vehicle stays in the state 1130 member, attached. If yes, the vehicle initiates the detachment handshake 1114 and renters the state 1112 member, not attached.

Figure 12:
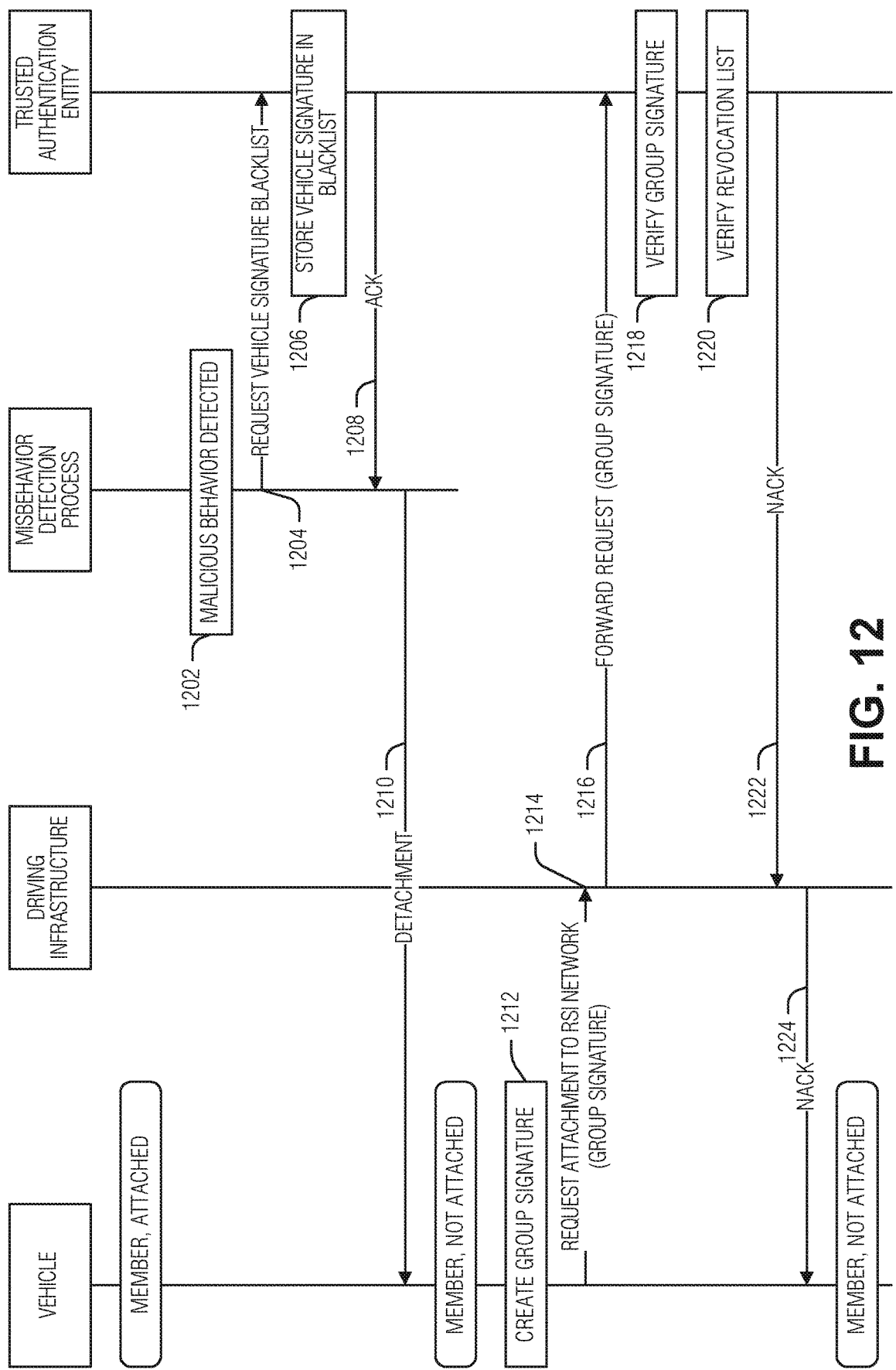
FIG. 12 illustrates a diagram of message flows between a vehicle, a roadside unit, and a trusted authentication entity during vehicle monitoring for malicious activity, according to an embodiment.

FIG. 12 illustrates a diagram of message flows between a vehicle, a roadside unit, and a trusted authentication entity during vehicle monitoring for malicious activity, according to an embodiment. This flow occurs when the vehicle is identified as behaving maliciously results in access revocation to the roadside network.

A vehicle that is already a member and is attached to the roadside network may behave in a way that is deemed malicious by the infrastructure (operation 1202). The infrastructure detaches the vehicle from the network—which may entail no longer providing services to the vehicle—and notifies the vehicle of the reasons for being detached (message 1210).

The network may notify the trusted authentication entity (message 1204) to blacklist the vehicle. The trusted authentication entity may then blacklist the signature associated with the vehicle last pseudonym id (operation 1206) and acknowledge the completion of the blacklisting (message 1208).

The vehicle may attempt to re-attach, by creating another group signature (operation 1212) and requesting attachment (message 1214). The signature is passed to the trusted authentication entity (message 1216) where a signature verification (operation 1218) will pass. However, the trusted authentication entity will realize that the vehicle has been blacklisted (operation 1220) and provide a negative acknowledgment (message 1222) to the roadside network. This will, in turn, result in the vehicle being denied attachment and being notified via a negative acknowledgment (message 1224). The vehicle's only way to reattach would be to request membership to the network again via the trusted authentication entity. This would hinder massive attacks, as they could be easily detected due to a high number of membership request attempts for a single vID.

Figure 13:
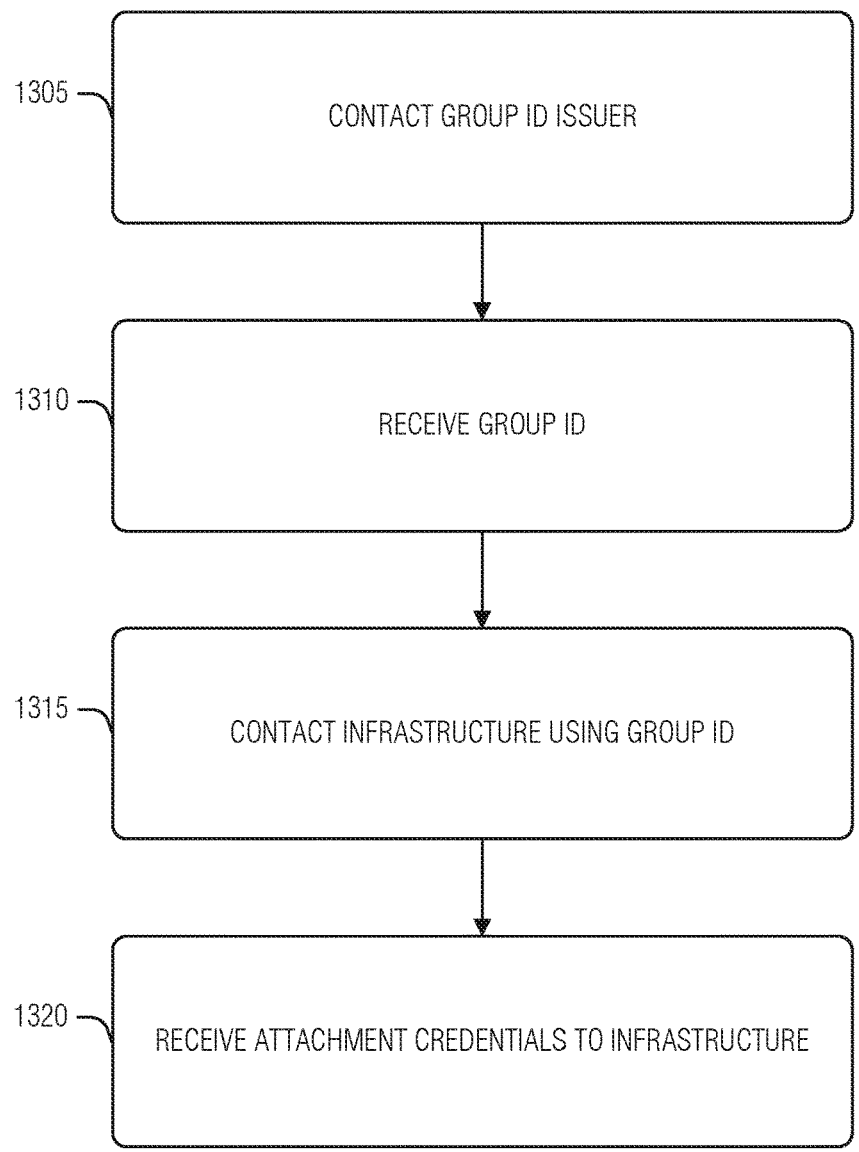
FIG. 13 is an example of a method for securing vehicle privacy in a driving infrastructure, according to an embodiment.

FIG. 13 is an example of a method 1300 for securing vehicle privacy in a driving infrastructure, according to an embodiment. The operations of the method 1300 are performed with computer hardware, such as that described above or below (e.g., processing circuitry).

At operation 1305, a vehicle contacts a group ID issuer to register the vehicle. In an example, contacting the group ID issuer includes using a vehicle ID to register as the member.

At operation 1310, a group ID is received, by the vehicle, from the group Id issuer to indicate acceptance as a member.

At operation 1315, the vehicle contacts a driving infrastructure to attach to the driving infrastructure using the group ID to identify the vehicle to the driving infrastructure. In an example, contacting the vehicle infrastructure includes communicating with an RSU, or another element of the roadside network.

In an example, the group ID comprises an asymmetric key pair. Here, a private key of the key pair is unique to the vehicle, and a public key of the key pair is common to several private keys including the private key unique to the vehicle. In an example, the group ID conforms to the Enhanced Privacy ID (EPID) family of standards.

At operation 1320, the vehicle receives an attachment ID from the driving infrastructure. Here, the attachment ID is used to secure communications between the vehicle and the driving infrastructure, including other vehicles. In an example, the attachment ID is a pseudonym ID for the vehicle. In an example, the vehicle may periodically obtain a new pseudonym ID that is different than a previous pseudonym ID for the vehicle.

In an example, the vehicle is denied access to the driving infrastructure in response to violation of a policy of the driving infrastructure. In an example, where EPID, or similar signature is used as the group ID, the group ID is used to distinguish the vehicle from other entities using the several private keys that are not the private key of the vehicle.

The systems and techniques described above ensure vehicle identity privacy, mitigating an obstacle for the public acceptance of collaborative automated driving at the application layer. Such adoption enables the practical implementation of computationally expensive privacy preserving authentication based on group-signatures, as contrary to VANETs, authentication needs to be performed only once per trip. Furthermore, using EPID, or the like, together with vehicle pseudonyms enables dynamic addition or removal of vehicles from the network without compromising their identity. True identity privacy may thus be achieved during roadside network attachment if the chosen wireless transport does not reveal it. Otherwise the privacy attack surface is at least minimized to the wireless operators.

Figure 14:
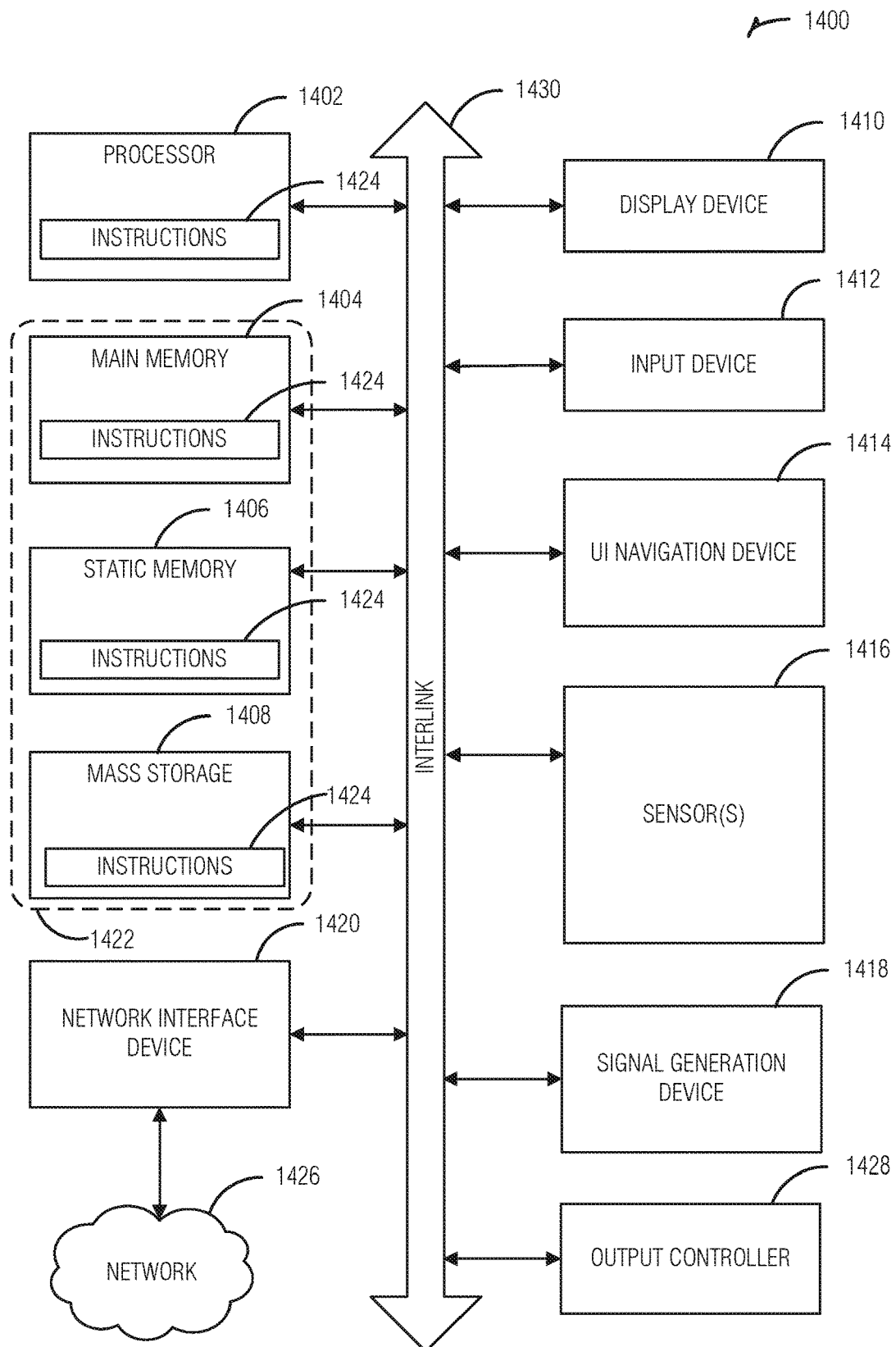
FIG. 14 is a block diagram illustrating an example of a machine upon which one or more embodiments may be implemented.

FIG. 14 illustrates a block diagram of an example machine 1400 upon which any one or more of the techniques (e.g., methodologies) discussed herein may perform. Examples, as described herein, may include, or may operate by, logic or a number of components, or mechanisms in the machine 1400. Circuitry (e.g., processing circuitry) is a collection of circuits implemented in tangible entities of the machine 1400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1400 follow.

In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a personal computer (PC), a tablet PC, a set-top box (STB), a personal digital assistant (PDA), a mobile telephone, a web appliance, a network router, switch or bridge, or any, machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1400 may include a hardware processor 1402 (e.g., a central processing unit (CPU), a graphics processing unit (GPU), a hardware processor core, or any combination thereof), a main memory 1404, a static memory (e.g., memory or storage for firmware, microcode, a basic-input-output (BIOS), unified extensible firmware interface (UM), etc.) 1406, and mass storage 1408 hard drive, tape drive, flash storage, or other block devices) some or all of which may communicate with each other via an interlink (e.g., bus) 1430. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1408, a signal generation device 1418 (e.g., a speaker), a network interface device 1420, and one or more sensors 1416, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1402, the main memory 1404, the static memory 1406, or the mass storage 1408 may be, or include, a machine readable medium 1422 on which is stored one or more sets of data structures or instructions 1424 (e.g., software) embodying or utilized by any one or more of the techniques or functions described herein. The instructions 1424 may also reside, completely or at least partially, within any of registers of the processor 1402, the main memory 1404, the static memory 1406, or the mass storage 1408 during execution thereof by the machine 1400. In an example, one or any combination of the hardware processor 1402, the main memory 1404, the static memory 1406, or the mass storage 1408 may constitute the machine readable media 1422. While the machine readable medium 1422 is illustrated as a single medium, the term "machine readable medium" may include a single medium or multiple media (e.g., a centralized or distributed database, and/or associated caches and servers) configured to store the one or more instructions 1424.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 may be further transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software. A transmission medium is a machine readable medium.

ADDITIONAL NOTES & EXAMPLES

Example 1 is a device for securing vehicle privacy in a driving infrastructure, the device comprising: an interface to communicate with a radio of a vehicle; a mount to affix the device to the vehicle; and processing circuitry configured to: contact, via the interface, a group identification (ID) issuer to register the vehicle; receive, via the interface, a group ID from the group ID issuer to indicate acceptance as a member; contact, via the interface, the driving infrastructure to attach to the driving infrastructure using the group ID to identify the vehicle to the driving infrastructure; and receive, via the interface, an attachment ID from the driving infrastructure, the attachment ID used to secure communications between the vehicle and the driving infrastructure.

In Example 2, the subject matter of Example 1, wherein the group ID comprises an asymmetric key pair, with a private key unique to the vehicle, and a public key common to several private keys including the private key unique to the vehicle.

In Example 3, the subject matter of Example 2, wherein the group ID conforms to the Enhanced Privacy ID (EPID) family of standards.

In Example 4, the subject matter of Example 3, wherein the vehicle is denied access to the driving infrastructure in response to violation of a policy of the driving infrastructure, wherein the EPID is used to distinguish the vehicle from other entities using the several private keys that are not the private key of the vehicle.

In Example 5, the subject matter of any of Examples 1-4, wherein the attachment ID is comprised of a pseudonym ID and a set of authentication public key certificates for the vehicle.

In Example 6, the subject matter of Example 5, wherein the processing circuitry to configured to periodically obtain a new pseudonym ID for the vehicle that is different than a previous pseudonym ID for the vehicle.

In Example 7, the subject matter of any of Examples 1-6, wherein, to contact the group ID issuer, the processing circuitry uses a vehicle ID to register as the member.

In Example 8, the subject matter of any of Examples 1-7, wherein, to contact the vehicle infrastructure, the processing circuitry communicates with a road side unit.

Example 9 is a method for securing vehicle privacy in a driving infrastructure, the method comprising: contacting, from a vehicle, a group identification (ID) issuer to register the vehicle; receiving a group ID from the group ID issuer to indicate acceptance as a member; contacting the driving infrastructure to attach to the driving infrastructure using the group ID to identify the vehicle to the driving infrastructure; and receiving an attachment ID from the driving infrastructure, the attachment ID used to secure communications between the vehicle and the driving infrastructure.

In Example 10, the subject matter of Example 9, wherein the group ID comprises an asymmetric key pair, with a private key unique to the vehicle, and a public key common to several private keys including the private key unique to the vehicle.

In Example 11, the subject matter of Example 10, wherein the group ID conforms to the Enhanced Privacy ID (EPID) family of standards.

In Example 12, the subject matter of Example 11, wherein the vehicle is denied access to the driving infrastructure in response to violation of a policy of the driving infrastructure, wherein the EPID is used to distinguish the vehicle from other entities using the several private keys that are not the private key of the vehicle.

In Example 13, the subject matter of any of Examples 9-12, wherein the attachment ID is comprised of a pseudonym ID and a set of authentication public key certificates for the vehicle.

In Example 14, the subject matter of Example 13, comprising periodically obtaining a new pseudonym ID for the vehicle that is different than a previous pseudonym ID for the vehicle.

In Example 15, the subject matter of any of Examples 9-14, wherein contacting the group ID issuer includes using a vehicle ID to register as the member.

In Example 16, the subject matter of any of Examples 9-15, wherein contacting the vehicle infrastructure includes communicating with a road side unit.

Example 17 is at least one machine-readable medium including instructions for securing vehicle privacy in a driving infrastructure, the instructions, when executed by processing circuitry of a vehicle, cause the processing circuitry to perform operations comprising: contacting a group identification (ID) issuer to register the vehicle; receiving a group ID from the group ID issuer to indicate acceptance as a member; contacting the driving infrastructure to attach to the driving infrastructure using the group ID to identify the vehicle to the driving infrastructure; and receiving an attachment ID from the driving infrastructure, the attachment ID used to secure communications between the vehicle and the driving infrastructure.

In Example 18, the subject matter of Example 17, wherein the group ID comprises an asymmetric key pair, with a private key unique to the vehicle, and a public key common to several private keys including the private key unique to the vehicle.

In Example 19, the subject matter of Example 18, wherein the group ID conforms to the Enhanced Privacy ID (EPID) family of standards.

In Example 20, the subject matter of Example 19, wherein the vehicle is denied access to the driving infrastructure in response to violation of a policy of the driving infrastructure, wherein the EPID is used to distinguish the vehicle from other entities using the several private keys that are not the private key of the vehicle.

In Example 21, the subject matter of any of Examples 17-20, wherein the attachment ID is comprised of a pseudonym ID and a set of authentication public key certificates for the vehicle.

In Example 22, the subject matter of Example 21, wherein the operations comprise periodically obtaining a new pseudonym ID for the vehicle that is different than a previous pseudonym ID for the vehicle.

In Example 23, the subject matter of any of Examples 17-22, wherein contacting the group ID issuer includes using a vehicle ID to register as the member.

In Example 24, the subject matter of any of Examples 17-23, wherein contacting the vehicle infrastructure includes communicating with a road side unit.

Example 25 is a system for securing vehicle privacy in a driving infrastructure, the system comprising: means for contacting, from a vehicle, a group identification (ID) issuer to register the vehicle; means for receiving a group ID from the group ID issuer to indicate acceptance as a member; means for contacting the driving infrastructure to attach to the driving infrastructure using the group ID to identify the vehicle to the driving infrastructure; and means for receiving an attachment ID from the driving infrastructure, the attachment ID used to secure communications between the vehicle and the driving infrastructure.

In Example 26, the subject matter of Example 25, wherein the group ID comprises an asymmetric key pair, with a private key unique to the vehicle, and a public key common to several private keys including the private key unique to the vehicle.

In Example 27, the subject matter of Example 26, wherein the group ID conforms to the Enhanced Privacy ID (EPID) family of standards.

In Example 28, the subject matter of Example 27, wherein the vehicle is denied access to the driving infrastructure in response to violation of a policy of the driving infrastructure, wherein the EPID is used to distinguish the vehicle from other entities using the several private keys that are not the private key of the vehicle.

In Example 29, the subject matter of any of Examples 25-28, wherein the attachment ID is comprised of a pseudonym ID and a set of authentication public key certificates for the vehicle.

In Example 30, the subject matter of Example 29, comprising means for periodically obtaining a new pseudonym ID for the vehicle that is different than a previous pseudonym ID for the vehicle.

In Example 31, the subject matter of any of Examples 25-30, wherein the means for contacting the group ID issuer include means for using a vehicle ID to register as the member.

In Example 32, the subject matter of any of Examples 25-31, wherein the means for contacting the vehicle infrastructure include means for communicating with a road side unit.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for securing vehicle privacy in a driving infrastructure, the device comprising:
   an interface to transmit and receive via a radio of a vehicle; and
   processing circuitry configured to:
      contact, using the radio via the interface, a group identification (ID) issuer to register the vehicle;
      receive, using the radio via the interface, a group ID from the group ID issuer to indicate acceptance as a member;
      contact, using the radio via the interface, the driving infrastructure to attach to the driving infrastructure using the group ID to anonymously identify the vehicle to the driving infrastructure, the driving infrastructure being independent from the group ID issuer; and
      receive, via the interface, an attachment ID from the driving infrastructure, the attachment ID used to secure communications between the vehicle and the driving infrastructure.

2. The device of claim 1, wherein the group ID comprises an asymmetric key pair, with a private key unique to the vehicle, and a public key common to several private keys including the private key unique to the vehicle.

3. The device of claim 2, wherein the group ID conforms to the Enhanced Privacy ID (EPID) family of standards.

4. The device of claim 3, wherein the vehicle is denied access to the driving infrastructure in response to violation of a policy of the driving infrastructure, wherein the EPID is used to distinguish the vehicle from other entities using the several private keys that are not the private key of the vehicle.

5. The device of claim 1, wherein the attachment ID is comprised of a pseudonym ID and a set of authentication public key certificates for the vehicle.

6. The device of claim 5, wherein the processing circuitry is configured to periodically obtain a new pseudonym ID for the vehicle that is different than a previous pseudonym ID for the vehicle.

7. The device of claim 1, wherein, to contact the group ID issuer, the processing circuitry uses a vehicle ID to register the vehicle as the member.

8. The device of claim 1, wherein, to contact the vehicle infrastructure, the processing circuitry communicates with a road side unit.

9. A method for securing vehicle privacy in a driving infrastructure, the method comprising:
   contacting, using a first radio transmission from a radio of a vehicle, a group identification (ID) issuer to register the vehicle;
   receiving, via the radio, a group ID from the group ID issuer to indicate acceptance as a member;
   contacting, using a second radio transmission from the radio, the driving infrastructure to attach to the driving infrastructure using the group ID to anonymously identify the vehicle to the driving infrastructure, the driving infrastructure being independent from the group ID issuer; and
   receiving an attachment ID from the driving infrastructure, the attachment ID used to secure communications between the vehicle and the driving infrastructure.

10. The method of claim 9, wherein the group ID comprises an asymmetric key pair, with a private key unique to the vehicle, and a public key common to several private keys including the private key unique to the vehicle.

11. The method of claim 10, wherein the group ID conforms to the Enhanced Privacy ID (EPID) family of standards.

12. The method of claim 11, wherein the vehicle is denied access to the driving infrastructure in response to violation of a policy of the driving infrastructure, wherein the EPID is used to distinguish the vehicle from other entities using the several private keys that are not the private key of the vehicle.

13. The method of claim 9, wherein the attachment ID is comprised of a pseudonym ID and a set of authentication public key certificates for the vehicle.

14. The method of claim 13, comprising periodically obtaining a new pseudonym ID for the vehicle that is different than a previous pseudonym ID for the vehicle.

15. The method of claim 9, wherein contacting the group ID issuer includes using a vehicle ID to register as the member.

16. The method of claim 9, wherein contacting the vehicle infrastructure includes communicating with a road side unit.

17. At least one non-transitory machine-readable medium including instructions for securing vehicle privacy in a driving infrastructure, the instructions, when executed by processing circuitry of a vehicle, cause the processing circuitry to perform operations comprising:
   contacting, using a first radio transmission from a radio of the vehicle, a group identification (ID) issuer to register the vehicle;
   receiving, via the radio, a group ID from the group ID issuer to indicate acceptance as a member;
   contacting, using a second radio transmission from the radio, the driving infrastructure to attach to the driving infrastructure using the group ID to anonymously identify the vehicle to the driving infrastructure, the driving infrastructure being independent from the group ID issuer; and
   receiving an attachment ID from the driving infrastructure, the attachment ID used to secure communications between the vehicle and the driving infrastructure.

18. The at least one non-transitory machine-readable medium of claim 17, wherein the group ID comprises an asymmetric key pair, with a private key unique to the vehicle, and a public key common to several private keys including the private key unique to the vehicle.

19. The at least one non-transitory machine-readable medium of claim 18, wherein the group ID conforms to the Enhanced Privacy ID (EPID) family of standards.

20. The at least one non-transitory machine-readable medium of claim 19, wherein the vehicle is denied access to the driving infrastructure in response to violation of a policy of the driving infrastructure, wherein the EPID is used to distinguish the vehicle from other entities using the several private keys that are not the private key of the vehicle.

21. The at least one non-transitory machine-readable medium of claim 17, wherein the attachment ID is comprised of a pseudonym ID and a set of authentication public key certificates for the vehicle.

22. The at least one non-transitory machine-readable medium of claim 21, wherein the operations comprise periodically obtaining a new pseudonym ID for the vehicle that is different than a previous pseudonym ID for the vehicle.

23. The at least one non-transitory machine-readable medium of claim 17, wherein contacting the group ID issuer includes using a vehicle ID to register as the member.

24. The at least one non-transitory machine-readable medium of claim 17, wherein contacting the vehicle infrastructure includes communicating with a road side unit.

\* \* \* \* \*